July 5, 1960     R. K. BOYER ET AL     2,943,969

METHOD OF MANUFACTURING A REPAIR PATCH

Filed March 30, 1956     2 Sheets-Sheet 1

INVENTORS
RALPH K. BOYER
BY HENRY W. KROHN, JR.

ATTORNEYS

INVENTORS
RALPH K. BOYER
BY HENRY W. KROHN, JR.
ATTORNEYS

United States Patent Office 2,943,969
Patented July 5, 1960

2,943,969

METHOD OF MANUFACTURING A REPAIR PATCH

Ralph K. Boyer, Cleveland, and Henry W. Krohn, Jr., North Olmsted, Ohio, assignors to The Dill Manufacturing Company, Cleveland, Ohio, a corporation of Ohio Filed Mar. 30, 1956, Ser. No. 575,106

3 Claims. (Cl. 154—110)

This invention relates to repair patches and a method of manufacturing repair patches for rubber articles such as tires, tubes, rubber balls, bags and the like.

It is a general object of this invention to provide a novel and improved repair patch, and a method of manufacturing repair patches, of a simple construction yet having the desired patch characteristics and which is relatively inexpensive to manufacture without any waste of patch materials during the manufacturing process.

Another object of this invention is to provide a novel and improved repair patch made up of cooperating layers of unvulcanized rubber having a reenforcing fabric embedded in between the rubber layers and which layers are shaped into an integral ruber body with a thin featheredge whereby the resulting patch can be easily used upon rubber articles as a cold patch.

Still another object of the invention is to provide a novel and improved repair patch comprising a reenforcing material sandwiched between layers of rubber and which repair patch is attached to a patch plate adapted for use with conventional vulcanizing units whereby it assumes a patch form upon being vulcanized to a rubber article.

Further and additional objects and advantages not referred to above will become apparent hereinafter during the following detailed description of the embodiments of the invention.

Referring to the accompanying drawings.

Figure 1:
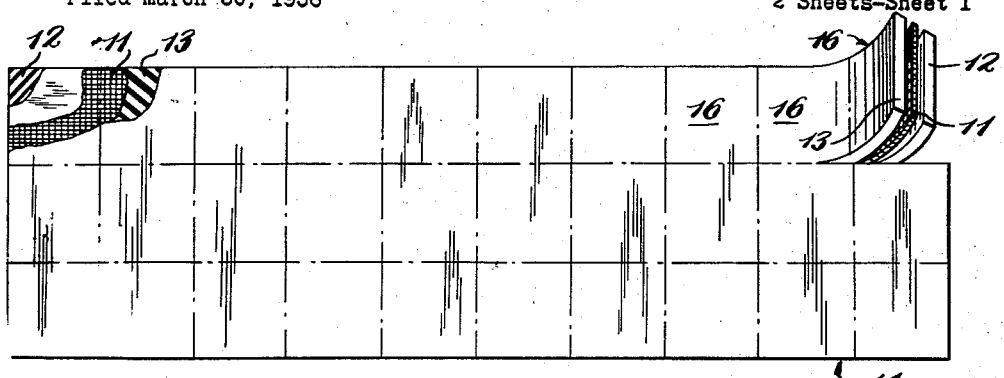
Fig. 1 is a top plan view, with portions broken away, of a patch sandwich strip employed in the method of manufacture and embodying the invention.
Figure 2:
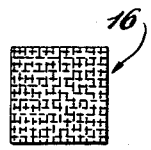
Fig. 2 is a top plan view of a patch square detached from the strip of Fig. 1 and prior to being shaped into a patch form.
Figure 3:
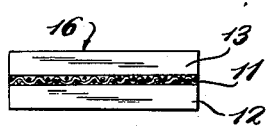
Fig. 3 is an enlarged elevational view of the patch square shown in Fig. 2.

The method of manufacturing a repair patch 10 comprises the building up of a sandwich made up of an open-mesh reenforcing material 11 secured between two layers of unvulcanized or uncured rubber 12 and 13. The rubber used for the layers 12 and 13 is passed through calendering rollers in the usual manner to press the rubber into the desired form and thickness. The rubber is formed in this manner for the purposes of the present invention into long, narrow strips similar to the rubber strips 12 and 13 for the sandwich strip 14. The sandwich strip 14 is built up by successively interleaving the rubber strips 12 and 13 on opposite sides of a reenforcing material 11 by passes through appropriate calendering rollers.

Upon attaining the sandwich strips 14, they are then subdivided into narrower strips and in this instance are shown being subdivided into three strips. The subdivided strips may have a width of approximately ¾ of an inch from which patch pieces or sandwich squares 16 of approximately ¾ of an inch are cut.

The steps in manufacturing both the hot and cold patch up through the steps of obtaining the patch pieces or sandwich squares 16 are similar and the remaining steps in manufacturing the cold patch will now be described, with the remaining steps leading to the manufacture of the hot patch to be described immediately hereinafter. The reenforcing material employed in the invention for both the cold and hot patch is preferably in the form of an open-mesh fabric and which fabric should have sufficient strength to be capable of taking the stress and strain on the patch while the rubber secured thereto is yet unvulcanized. It is further thought desirable to employ a reenforcing material having the same modulus of elasticity as the article to be repaired to thereby present a homogeneous body. For example: In a tubeless tire a nylon fabric is employed and the reenforcing material employed in the rubber patch 10 is of the same type nylon.

Figure 6:
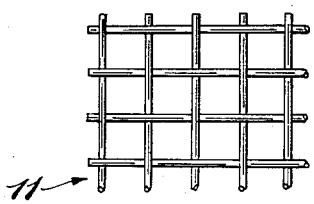
Fig. 6 is an enlarged view of an open-mesh reenforcing material employed in the invention.
Figure 9:
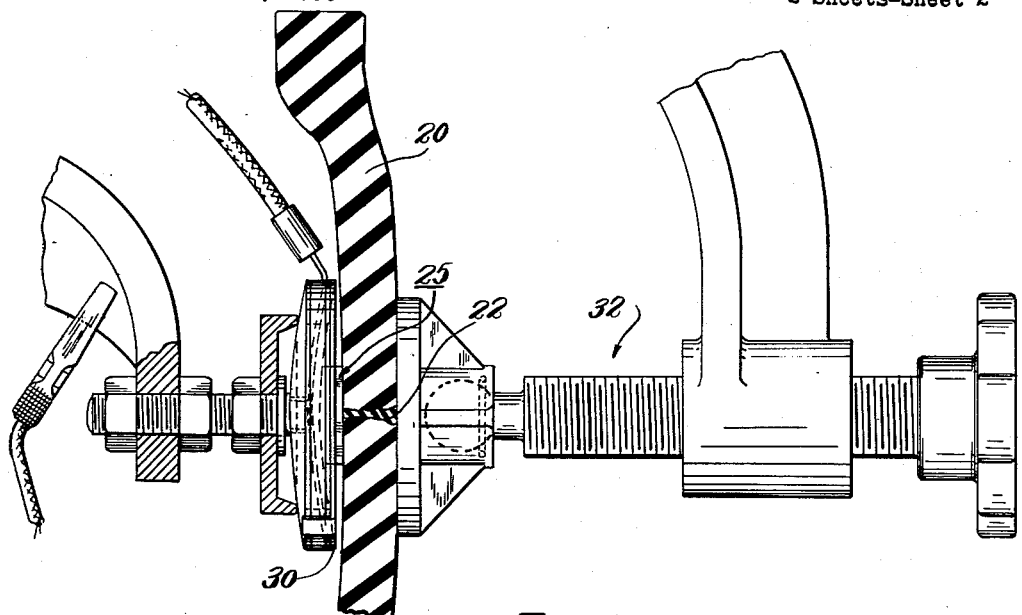
Fig. 9 is a partial elevational and fragmentary sectional view of an electric vulcanizing unit secured in a vulcanizing position to a tubeless tire.
Figures 7, 8:
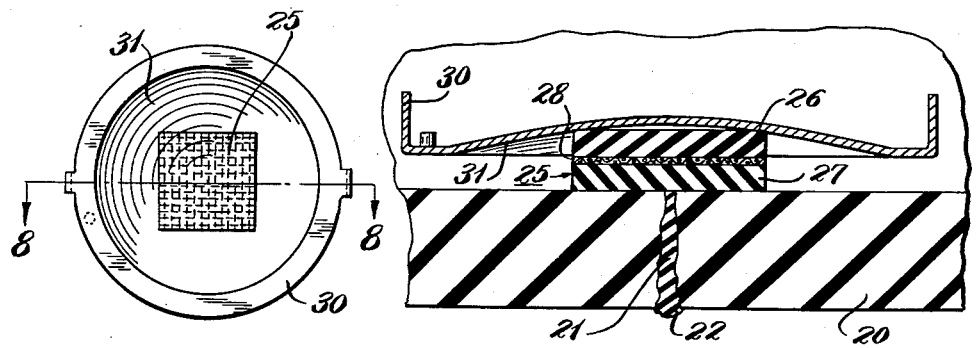
Fig. 7 is a plan view of a patch plate for use with a vulcanizing unit and shown with a repair patch square applied thereto.
Fig. 8 is a fragmentary sectional view of a tubeless tire showing the patch plate of Fig. 7 prior to the application of pressure thereto.

The openings in the reenforcing material 11 should be sufficient to allow the layers of rubber to unite through the openings. A reenforcing material wherein the openings are formed by threads or fibers at right angles to one another, as shown in Fig. 6, and provided with openings on the order of $\frac{1}{24}$ of an inch has been found to be satisfactory. It should be understood that it is not intended to be limited to any dimension of the openings in the reenforcing material nor to any type of material since the reenforcing material may be any material consistent with the aforementioned characteristics and as a further example a Fiberglas material has been found to be satisfactory.

The rubber employed in the rubber patch 10 when a cold patch is desired is provided with small amounts of sulphur incorporated in both layers of the rubber in essentially the same amounts. The rubber at this point in the manufacturing process is still unvulcanized and retains its unvulcanized appearance.

Having provided the patch sandwiches 16 they are now formed into a cold patch form by placing them in a hot mold to give the square sandwich 16 the desired patch form. In this instance the mold is provided with a concave surface cooperating with a flat plate so as to shape the square patch 16 into a round patch form. The patch sandwich 16 is shaped by the mold to form a thickened body portion 17 around the reenforcing material 11, which retains its original square shape. The rubber of the layers 12 and 13 is in this manner compressed into an integral rubber body and united through the openings of the reenforcing material 11 to sandwich the material therebetween and is also caused to flow gradually outwardly to form a tapered portion 18 with a featheredge 19 at the peripheral edge thereof. The patch 10 may be partially cured by placing it in an oven; that is, the rubber is not cured to the full extent of the sulphur present therein and can be said to be semicured or semivulcanized.

It should be noted that the round patch form was formed from the square patch sandwich 16 and which sandwich was cut from the strip 14 without any waste of material as would be present if the patch sandwiches were cut into circular shapes, initially, having equivalent areas. It is an important feature of this invention that the patch sandwich 16 be cut into square or rectangular forms since it does not require any additional marginal material surrounding the patch form itself to give it sufficient tensile strength to be pulled through the cutting apparatus and which marginal material is generally waste. This is particularly true in manufacturing repair patches of the type of the present invention since the unvulcanized rubber has the reenforcing material embedded therein and cannot be reclaimed. The savings in material in cutting out the square patches and forming them in this manner rather than an equivalent circular patch is of the order of 87%.

Figure 5:
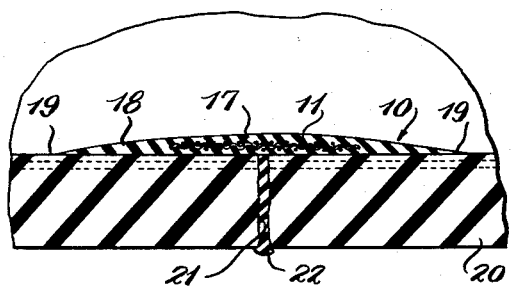
Fig. 5 is a fragmentary sectional view of a tubeless tire with the cold repair patch of the present invention applied thereto.
Figure 4:
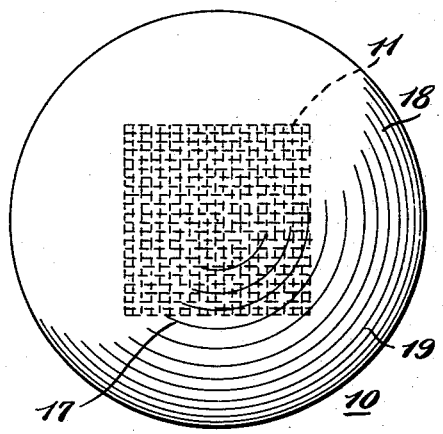
Fig. 4 is an enlarged top plan view of the repair patch.

The use of the rubber patch 10 when manufactured as a cold patch, as hereinabove described, on a tubeless tire 20 is shown in Fig. 5, the tire 20 being shown with a puncture 21 and the inner surface of the tire adjacent the puncture is prepared in the usual manner to allow the patch 10 to adhere thereto. The puncture 21 is first filled with unvulcanized rubber 22, as shown, and the patch 10 is then applied to the prepared surface of the tire 20 and over the unvulcanized rubber 22 to retain the latter in position. The patch 10 is attached to the tire 20 through the use of a commercially available cement and which cement is provided with accelerators therein to react chemically with the remaining uncombined sulphur present in the rubber to, in time, fully cure the rubber to the extent of the sulphur present. Accordingly, during the intervening period the reenforcing material 15 provides the necessary strength in the patch 10 to take the stress and strain resulting from the use of the tire 20.

Now referring to Figs. 7–10, the description of the manufacture of a hot patch 25 constructed and manufactured substantially as described hereinabove for the cold patch up to and including the forming of the patch squares will be continued. The hot patch squares comprise two layers of unvulcanized rubber 26 and 27 sandwiching an open-mesh reenforcing material 28. The rubber employed to produce the hot patch 25 also has sulphur incorporated therein and it has been found best to employ more sulphur than in the cold patch and also to add accelerators thereto. The sulphur in the layers of rubber 26 and 27 is retained completely uncured during the manufacturing of the hot patch. The reenforcing material 28 employed in the hot patch is essentially of the same general characteristics as mentioned hereinabove for the cold patch. Accordingly, upon obtaining the patch squares 25 for the hot patch, the squares are then applied to a patch plate 30 having a concave surface to which the patch is cemented. The patch plate 30, in this instance, is shown as having a circular concave shape to form a circular patch form. However, the concave surface 31 may have any other desired geometrical shape to mold the patch into a desired configuration.

Figure 10:
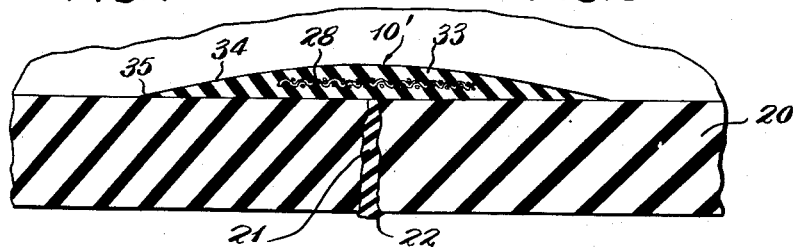
Fig. 10 is a fragmentary sectional view of a tubeless tire with a repair patch vulcanized thereto.

The patch plate 30 is adapted to be used with a vulcanizing clamp, preferably of the type disclosed in Patent Re. 21,230, granted October 10, 1939, and generally identified in the drawings by the reference character 32. The patch plate 30 cooperates with the heating element of the clamp 32 and the clamp is effective due to the heat and pressure resulting therefrom to fully combine the sulphur present in the rubber and to vulcanize the patch 25 to a rubber article. The clamp 32 is shown in the drawings applying the patch 25 to a tubeless tire 20 having the unvulcanized rubber 22 positioned in the puncture 21. Under the heat and pressure of the clamp 32 the square patch 25 upon vulcanization will assume a round patch form 10' as was obtained from the mold for the cold patch, and as shown in Fig. 10, having a thickened body portion 33 around the reenforcing material 28 and forming a tapered portion 34 with a featheredge 35.

It should be noted that the patch plate 30 acts not merely as a carrier for the patch piece but is also formed as a mold adapted to shape the patch piece into a desired patch form and in the correct position on the article to be repaired.

Although preferred forms of the invention have been described and illustrated herein, it will be understood that the invention may be embodied in other forms coming within the scope and meaning of the appended claims.

Having thus described my invention, I claim:

1. The method of manufacturing rubber repair patches for tires, inner tubes and the like which comprises interleaving between two identical sized rectangular sheets of uncured rubber composition of identical flow characteristics when subjected to heat and pressure and elongated in length as compared to their width a sheet of the same area size of open mesh fabric of a type through which the rubber composition can flow to be intermixed and integrated and which sheet of fabric is relatively thin as compared to the thickness of said two sheets of uncured rubber composition; applying sufficient pressure to the interleaved sheets of rubber composition and open mesh fabric to cause the rubber of the two sheets of rubber composition to flow through the openings in the fabric and become intermingled and integrated to unite the two sheets of rubber composition; then severing the united interleaved sheets into a plurality of rectangular patch pieces the aggregate surface area of which equals the surface area of the undivided integrated interleaved sheets and then subjecting each patch piece to heat and pressure in cooperating mold members defining a mold cavity of curved outline and of greater area than the area of the patch piece and with one of the mold members of concave configuration on the side that engages the patch piece and the other of the mold members of planular shape on the side that engages the patch piece and thereby forming each patch piece into a patch having a relatively thick convex central body portion and a peripherally curved skirt portion of rubber extending beyond the sides of the rectangular mesh fabric in the patch piece and thinned out to form a feather edge, with said body portion and skirt portion having a continuous planular surface on one side of the patch.

2. The method defined in claim 1 and wherein the step of severing the integrated interleaved sheets of rubber composition and fabric into patch pieces includes cutting the interleaved sheets into strips and severing the strips to produce the patch pieces.

3. The method as defined in claim 1 and wherein the step of interleaving between the two identical sized rectangular sheets of uncured rubber composition a sheet of open mesh fabric includes interleaving a sheet of open mesh fabric having substantially the same modulus of elasticity as the article with which the patch is intended to be used.

References Cited in the file of this patent

UNITED STATES PATENTS

| 1,163,629 | Low | Dec. 7, 1915 |
| 1,402,288 | Fisher | Jan. 3, 1922 |
| 1,602,870 | Villiers | Oct. 12, 1926 |
| 2,587,759 | Pierce | Mar. 4, 1952 |
| 2,618,016 | Anderson | Nov. 18, 1952 |
| 2,624,689 | Peters et al. | Jan. 6, 1953 |

FOREIGN PATENTS

| 28,126 | Great Britain | 1912 |
| 728,934 | Great Britain | Apr. 27, 1955 |
| 869,029 | France | Oct. 29, 1941 |